(No Model.)

C. H. BACON.
MERCURY WATER METER.

No. 248,248.

Patented Oct. 11, 1881.

WITNESSES
Frank G. Parker
J. L. G. Rice

INVENTOR
Charles H. Bacon

UNITED STATES PATENT OFFICE.

CHARLES H. BACON, OF BOSTON, MASSACHUSETTS.

MERCURY WATER-METER.

SPECIFICATION forming part of Letters Patent No. 248,248, dated October 11, 1881.

Application filed March 16, 1881. (No model.)

*To all whom it may concern:*

Be it known that I, CHARLES H. BACON, a citizen of the United States, residing at Boston, in the county of Suffolk and State of Massachusetts, have invented a new and useful Water-Meter, of which the following is a specification.

The object of my invention is to provide a water-meter made upon what is known as the "piston" system, but in the place of the common piston, with its rapidly-wearing packing, I substitute a quantity of quicksilver, which I believe to be practically indestructible when used in the following described water-meter.

My invention consists of two cylindrical water-chambers, which are connected by a pipe, and which are each connected by a pipe to a valve-chamber, into which the inlet and outlet pipes pass. These cylindrical water-chambers at the start are about half filled with quicksilver. The water, being admitted into the valve-chamber, rushes into one of the pipes which lead into one of the cylindrical chambers and forces most of the quicksilver into the other chamber, forcing also the water which is in this chamber into the valve-chamber and through the outlet-pipe. Meanwhile the cylindrical chambers, which are balanced on suitable bearings, being made to move to one side by the weight of quicksilver having passed over the center, tip and move by means of an arm on one side of the cylindrical chamber the valve in the valve-chamber. This causes the water to rush into the opposite cylinder, and the movement of water just described is repeated, only in opposite cylinders.

Connected with the arms of the valve, or in any suitable place, is the register.

The accompanying drawings clearly illustrate my invention.

Figure 1:
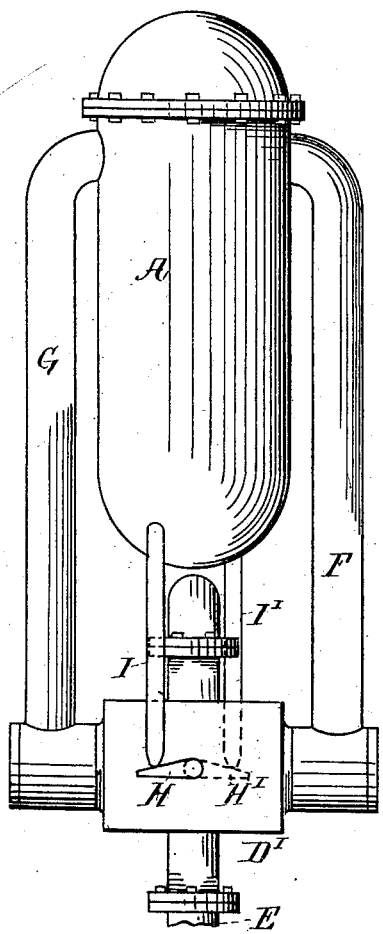
Figure 2:
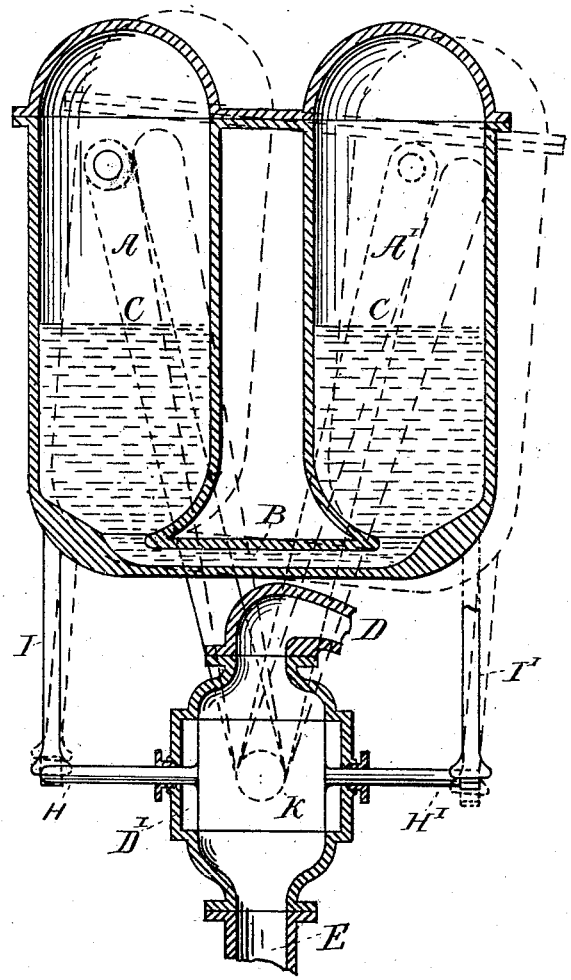
Figure 3:
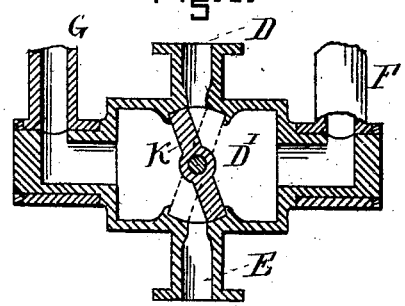

Figure 1 is an end elevation of a meter of my invention. Fig. 2 is a sectional view of the same. Fig. 3 is an end view of a section through the valve-chamber.

A A' are cylindrical water-chambers. B is the pipe connecting these two water-chambers. C is the quicksilver. D is the inlet; D', the valve; E, the outlet-pipe; F and G, pipes that enter into the water-chambers. H H' are the arms of the valve, which are moved by the arms I I' on the water-chambers. K is the "butterfly-valve" that is in the valve-chamber.

The principle of my invention consists in the use of quicksilver as a piston in a water-meter. In the application of this principle I do not limit myself to any particular form in the construction of the water-chambers, the connecting-pipe, the inlet and outlet, or the valve or cut-off.

What I claim as my invention, and desire to secure by Letters Patent, is—

In a water-meter, two or more water-chambers, A A', partially filled with quicksilver, in combination with connecting-pipes B, G, and F, inlet D, and outlet E, and valve or cut-off K, substantially as set forth.

CHARLES H. BACON.

Witnesses:
S. O. BURT,
I. L. G. RICE.